United States Patent
Skellenger et al.

(10) Patent No.: US 10,000,233 B2
(45) Date of Patent: Jun. 19, 2018

(54) METHOD OF CONTROLLING AN INVERTER DURING MOSFET SHORTS

(71) Applicant: STEERING SOLUTIONS IP HOLDING CORPORATION, Saginaw, MI (US)

(72) Inventors: Dennis B. Skellenger, Saginaw, MI (US); Ashok Chandy, Palo Alto, CA (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days. days.

(21) Appl. No.: 15/417,797

(22) Filed: Jan. 27, 2017

(65) Prior Publication Data

US 2017/0217480 A1 Aug. 3, 2017

Related U.S. Application Data

(60) Provisional application No. 62/288,224, filed on Jan. 28, 2016.

(51) Int. Cl.
| | |
|---|---|
| *H02P 1/00* | (2006.01) |
| *H02P 3/00* | (2006.01) |
| *H02P 5/00* | (2016.01) |
| *B62D 5/04* | (2006.01) |
| *B62D 6/10* | (2006.01) |
| *H02P 27/08* | (2006.01) |
| *H02P 29/024* | (2016.01) |
| *H02P 29/028* | (2016.01) |
| *B62D 15/02* | (2006.01) |

(52) U.S. Cl.
CPC ......... *B62D 5/0463* (2013.01); *B62D 5/0484* (2013.01); *B62D 5/0487* (2013.01); *B62D 6/10* (2013.01); *H02P 27/08* (2013.01); *H02P 29/027* (2013.01); *H02P 29/028* (2013.01); *B62D 15/02* (2013.01)

(58) Field of Classification Search
CPC ... B62D 5/0463; B62D 5/0484; B02D 5/0487
USPC ........................................................ 318/383
See application file for complete search history.

(56) References Cited

U.S. PATENT DOCUMENTS

| | | | |
|---|---|---|---|
| 6,407,524 B1* | 6/2002 | Endo ...................... | B62D 5/046 318/432 |
| 2010/0181949 A1* | 7/2010 | Bates ....................... | H02P 1/04 318/400.09 |
| 2012/0191302 A1* | 7/2012 | Sternecker ........... | B62D 5/0463 701/41 |

* cited by examiner

*Primary Examiner* — Erick Glass
(74) *Attorney, Agent, or Firm* — Cantor Colburn LLP (57) ABSTRACT

Technical solutions are described for mitigating braking torque in a motor of a steering system caused by a FET short. For example, an example mitigation system includes a mitigation module that adjusts a motor torque in response to a FET short. The mitigation system further includes a mitigation-enable module that selectively enables and disables the mitigation module based on a handwheel torque signal. Further, the mitigation system includes a damping module that reduces the motor torque based on a motor velocity signal for the motor.

20 Claims, 10 Drawing Sheets

METHOD OF CONTROLLING AN INVERTER DURING MOSFET SHORTS

CROSS-REFERENCES TO RELATED APPLICATIONS

This patent application claims priority to U.S. Provisional Patent Application Ser. No. 62/288,224, filed Jan. 28, 2016, which is incorporated herein by reference in its entirety.

BACKGROUND

The present application generally relates to the field of electric motor controls, and specifically to an automotive power steering control system.

Typically, automobiles today use power steering systems, such as electric power steering (EPS) systems. In an EPS system, a driver's effort to steer the automotive are assisted by powered systems driven electrically. For example, the EPS system provides a steering torque assist directly by an electric motor drive. The motor itself can include a three-phase permanent magnet synchronous motor, or any other motor. The motor is driven from power sources such as a vehicle battery through application of an inverter system. The drive is typically monitored and controlled by a processing unit with sensors to detect the operating conditions of the motor. The EPS drive assist is called into use based on driver demand. Specifically, as a driver applies a steering force in one direction, the EPS system supplies a further torque in the same direction. The EPS system provides damping for the road feel and rack/column effects for return and other features. In other words, the EPS system works in all four torque speed quadrants. However, in case of inverter failure, the torque from the EPS motor can generate steering torque as current conducts through shorted circuit elements and body diodes as the motor back EMF increases due to motor velocity, temporarily shorting the phases. For example, a driver could be turning while the motor drive erroneously provides damping torque resulting in higher efforts, which is undesirable.

The motor may be operated by a current mode controller. For current mode control, the current flowing into motor terminals is measured and compared to a calculated reference current signal and are representative of desired current for the motor to affect desired operating conditions.

Thus, if phase coils of a motor of the EPS system become undesirably shorted together, for example because of a MOSFET short, the motor acts as a generator device and a braking torque is applied to a shaft of the motor. (MOSFET=metal-oxide-semiconductor field-effect transistor). During this condition, vehicle operator must overcome the braking torque of the motor while turning a vehicle steering wheel in order to steer the vehicle.

Typically, EPS systems use a MOSFET failure mitigation technique for commutation while a MOSFET is shorted to produce an increased amount of assist torque in the event of a short circuit. When the MOSFET is shorted and producing braking torque, the commutation may be shut off. This is because a complementary MOSFET cannot be turned on due to a high current event. MOSFET mitigation may reduce the time and effort to steer the vehicle but may produce a large amount of torque ripple. This is due at least in part to the increased velocity when applying an assist torque. This in turn results in a harsh feeling for a driver using the steering system.

Accordingly, it is desirable to improve MOSFET fault mitigation, particularly in a steering system to provide a driver a more comfortable driving experience.

SUMMARY

In accordance with one or more embodiments, a system for mitigating braking torque in a motor of a steering system includes a mitigation module that adjusts a motor torque in response to a FET short. The mitigation system further includes a mitigation-enable module that selectively enables and disables the mitigation module based on a handwheel torque signal. Further, the mitigation system includes a damping module that reduces the motor torque based on a motor velocity signal for the motor.

In accordance with one or more embodiments, a method for mitigating braking torque in a motor of a steering system includes adjusting, by a mitigation module, a motor torque generated by the motor in response to a FET short. The method further includes selectively enabling and disabling, by a mitigation-enable module, the mitigation module based on an input torque. The method further includes reducing, by a damping module, the motor torque based on a motor velocity signal for the motor.

In accordance with one or more embodiments, a computer program product including a non-volatile computer readable medium includes computer executable instructions to adjust a motor torque generated by the motor in response to a FET short, the motor torque generated to assist an input torque. The computer storage medium further includes instructions to selectively enable and disable the mitigating based on the input torque. The computer storage medium further includes instructions to reduce the motor torque based on a motor velocity signal for the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned. Further, for purposes of understanding, the term "signal" utilized herein is defined as any electrical signal or any stored or transmitted value. For example, a signal can comprise a voltage, or a current. Further yet, a signal can comprise any stored or transmitted value such as binary values, scalar values, or the like.

Figure 1:
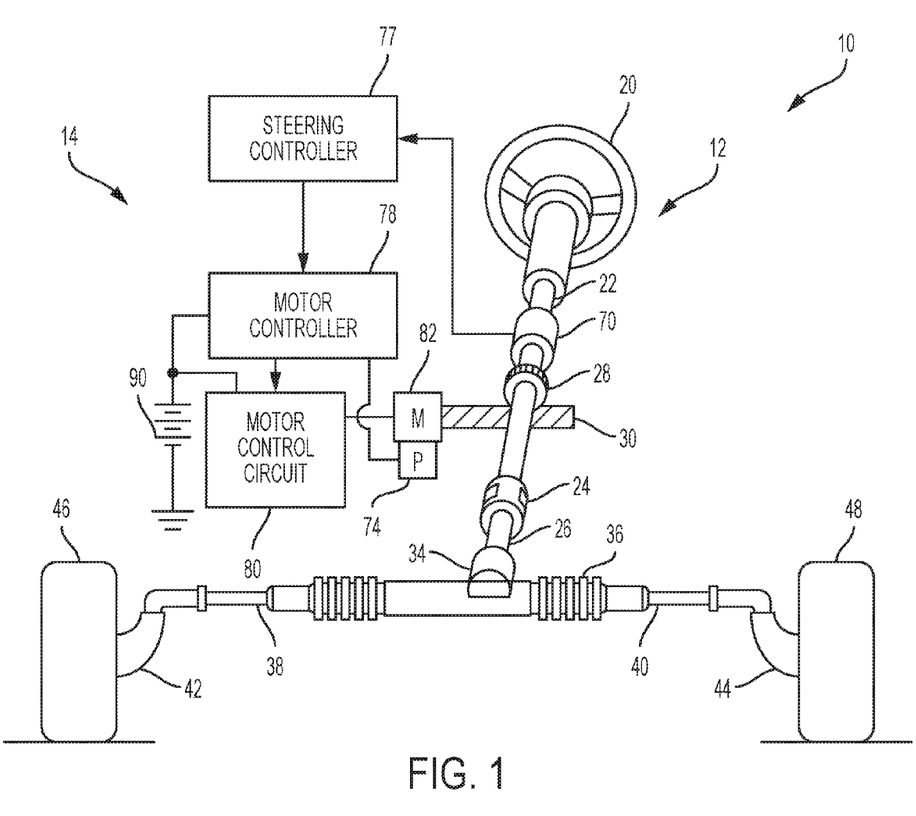
FIG. 1 illustrates a vehicle having a steering system and a motor control system, according to one or more embodiments.
Figure 2:
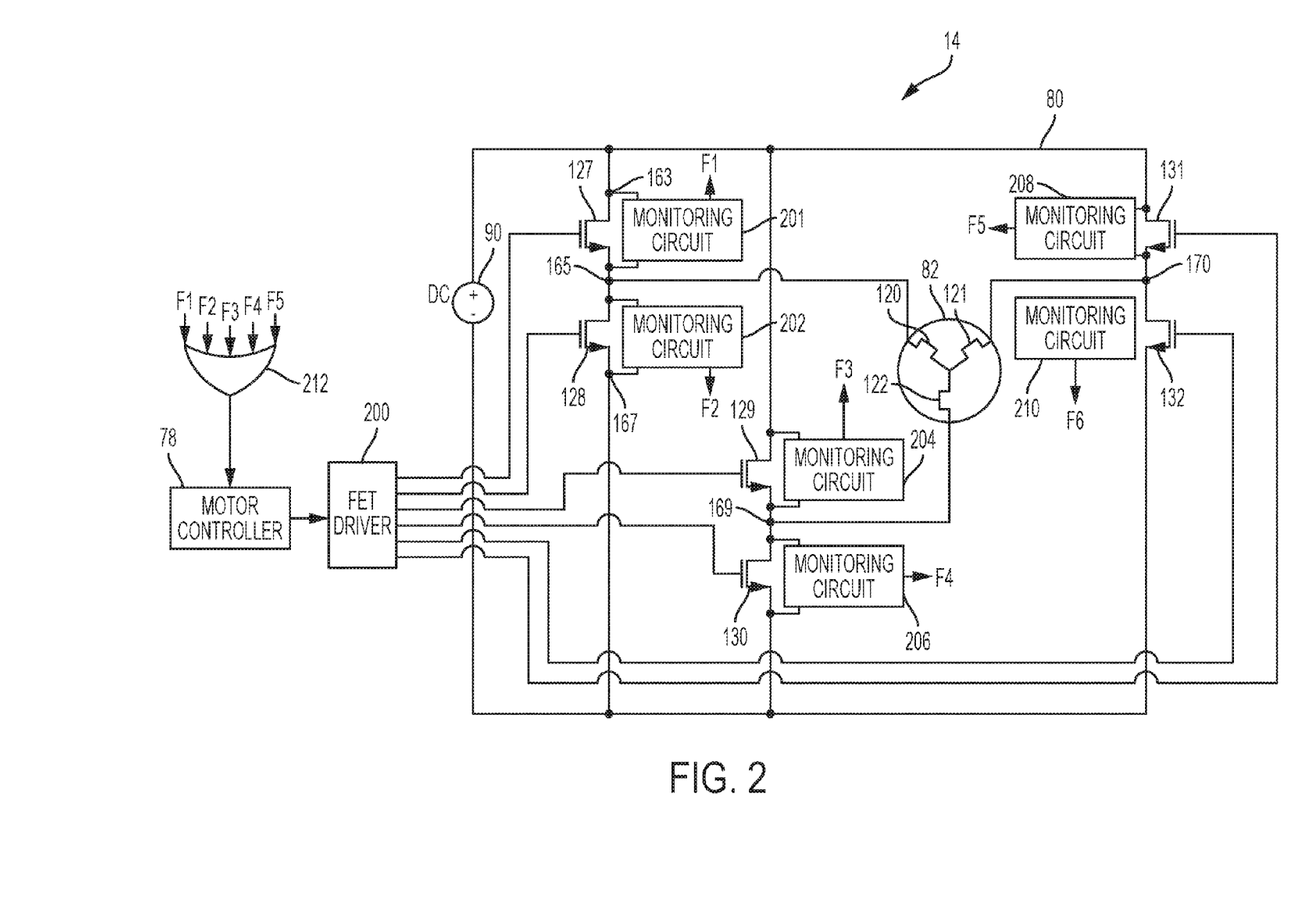
FIG. 2 illustrates a motor control circuit according to one or more embodiments.

Referring to FIGS. 1 and 2, a vehicle 10 having a steering system 12 and a motor control system 14 is illustrated.

The steering system 12 is provided to steer the vehicle 10 in a desired direction. The steering system includes a handwheel 20, an upper steering shaft 22, a universal joint 24, a lower steering shaft 26, a worm gear 28, a worm 30, a gear housing 34, a rack and pinion steering mechanism 36, tie rods 38, 40, steering knuckles 42, 44, and roadway wheels 46, 48. In one exemplary embodiment, the steering system 12 is an electric power steering system that utilizes the rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering shaft 22 connected to the lower steering shaft 26 turns the pinion gear. Rotation of the pinion gear moves the toothed rack which moves the tie rods 39, 40 which in turn moves the steering knuckles 42, 44, respectively, and the roadway wheels 46, 48, respectively.

The motor control system 14 is provided to control operation of the motor 82 in order to assist a vehicle operator in steering the vehicle 10. The control system 14 includes a handwheel torque sensor 70, a position sensor 74, a steering controller 77, a motor controller 78, and a motor control circuit 80.

The handwheel torque sensor 70 is provided to generate a signal indicative of an amount of torque being applied to the vehicle handwheel 20 by a vehicle operator. In one exemplary embodiment, the handwheel torque sensor 70 includes a torsion bar (not shown) which outputs a signal to the controller 78 based on an amount of twist of the torsion bar. It should be noted, that although the embodiments described herein use a handwheel torque signal, in other examples, the technical solutions described herein may be implemented using one or more other input torque signals that are indicative of a desired assist torque from the motor 82. For example, the technical solutions herein may be implemented using a torque signal measured by a motor torque sensor that measures the torque signal from the motor shaft.

The position sensor 74 is provided to generate a signal indicative of a position of a rotor of the motor 82. As shown, the position sensor 74 operably communicates with the motor controller 78.

The steering controller 77 is provided to generate a commanded torque value for the motor 82 based on the signal from the handwheel torque sensor 70. The steering controller 77 sends the commanded torque value to the motor controller 78.

The motor controller 78 is provided to generate control signals for controlling operation of the FET driver 200 and the motor control circuit 80, for controlling a torque output by the motor 82. The motor controller 78 is also provided to determine when one or more of the transistors 127, 128, 129, 130, 131, 132 have a shorted operational condition based on signals from the monitoring circuits 202, 201, 206, 204, 210, 208, respectively which are logically ORed in the logical OR gate 212. The output signal from the gate 212 is received by the motor controller 78. The operation of the motor controller 78 will be explained in greater detail hereinafter.

Referring to FIG. 2, the motor control circuit 80 is provided to generate commutation pulses for controlling operation of a three-phase brushless electrical motor 82. The motor 82 includes phase coils 120, 121, and 122 having a Y-configuration, and a rotor (not shown). The motor control circuit 80 includes switches 127, 128, 129, 130, 131 and 132, FET driver 200, monitoring circuits 201, 202, 204, 206, 208, 210 and the logical OR gate 212. It should be noted that in an alternative embodiment, the motor 8d could have less than three phase coils or more than three phase coils.

The transistors 127, 128, 129, 130, 131 and 132 are provided to selectively couple the battery 90 with phase coils 120, 121, 122 to energize and de-energize the coils. The transistors 127, 128, 129, 130, 131 and 132 may take any of a plurality of forms well-known in the art. For example, the transistors may comprise MOSFETs. As shown, the transistors 127, 128 are connected in series between positive and negative terminals of battery 90. A node 165 between transistors 127, 128 is electrically coupled to the phase coil 120. The transistors 131, 132 are connected in series between positive and negative terminals of the battery 90. A node 170 between switches 131, 132 is electrically coupled to the phase coil 121. The transistors 129, 130 are connected in series between positive and negative terminals of the battery 90. A node 169 between transistors 129, 130 is electrically coupled to the phase coil 122.

The FET driver 200 is provided to control the operational states of the transistors 127, 128, 129, 130, 131 and 132, in response to control signals received from the motor controller 78. As shown, the FET driver 200 is electrically coupled to gates of the transistors 127, 128, 129, 130, 131 and 132.

Figure 3:
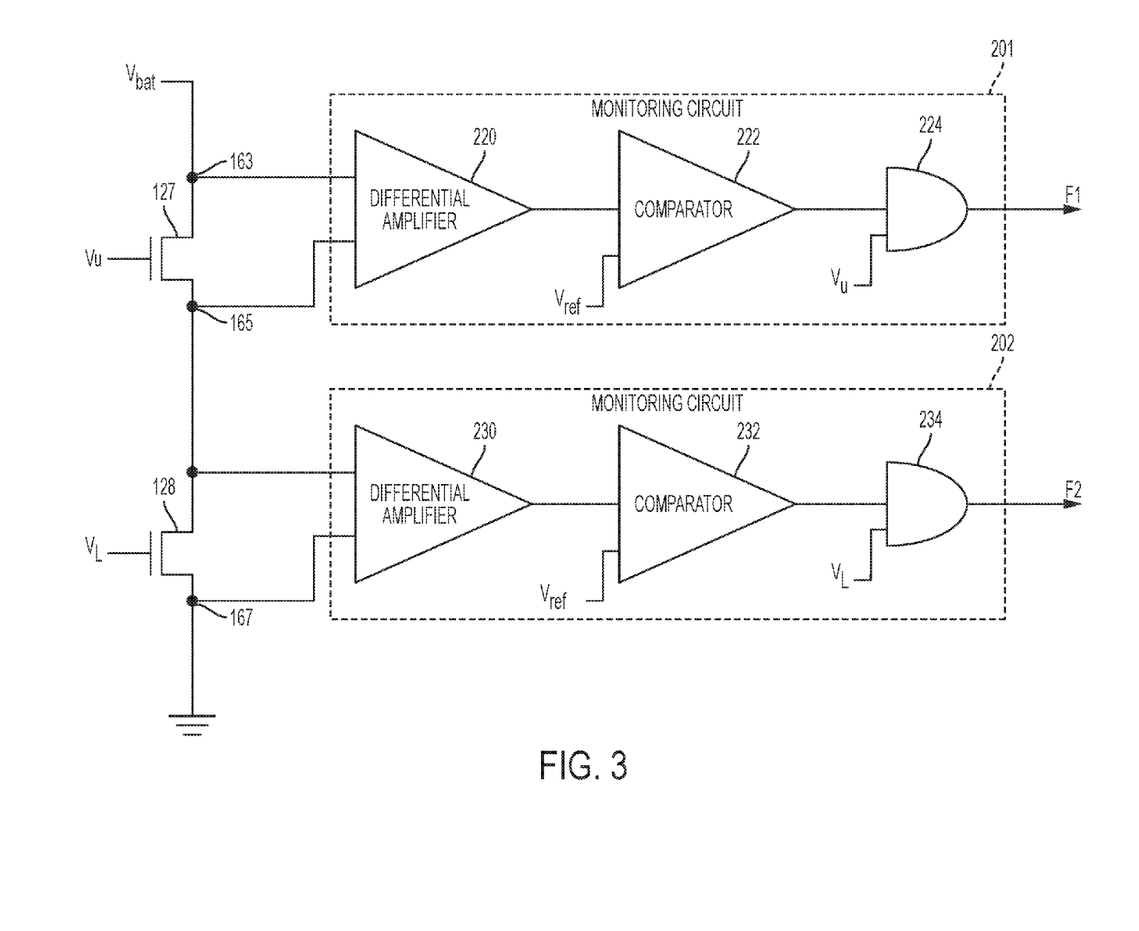
FIG. 3 illustrates a monitoring circuit according to one or more embodiments.

The monitoring circuits 201, 202, 204, 206, 208, 210 are provided to detect shorted operational conditions of the transistors 128, 127, 130, 129, 132, 131, respectively. Referring to FIG. 3, the monitoring circuit 201 will now be explained in greater detail. It should be noted that the monitoring circuits 204, 208 have a substantially similar configuration as the monitoring circuit 201. Accordingly, only a detailed description of the monitoring circuit 201 will be provided herein.

The monitoring circuit 201 is provided to detect a shorted operational condition of the transistor 128. The monitoring circuit 201 includes a differential amplifier 220, a comparator 222 and a logical AND gate 224. The differential amplifier 220 has first and second input terminals electrically coupled to nodes 163, 165, respectively. An output terminal of the differential amplifier 220 is electrically coupled to a first input terminal of the comparator 222. A second input terminal of the comparator 222 receives a reference voltage (Vref). An output terminal of the comparator 222 is electrically coupled to a first input terminal of the logical AND gate 224. A second input terminal of the logical AND gate 224 receives a voltage (VU) that is also received by the gate terminal of the transistor 127. An output terminal of the logical AND gate 224 is electrically coupled to the logical OR gate 212. When a short or undervoltage fault is being reported, detailed fault information can be provided by the fault outputs as a serial data word. The fault outputs can be provided to a fault detection module as inputs for deciphering the fault information. In one or more examples, a short to supply is detected by monitoring the drain-source voltage, $V_{DS}$, of each of the FETs and comparing with a predetermined drain-source threshold ($V_{DSTH}$). For example, the $V_{ref}$ for the comparators 222 and 232 is set to Vdsth, which is the minimum voltage that the drain to source would see in the event of a shoot through on the MOSFET. The voltage is independent of whether the MOSFET is an upper transistor 127 or a lower transistor 128.

The monitoring circuit 202 will now be explained in greater detail. It should be noted that the monitoring circuits 206, 210 have a substantially similar configuration as monitoring circuit 202. The monitoring circuit 202 is provided to detect a shorted operational condition of the transistor 127. The monitoring circuit 202 includes a differential amplifier 230, a comparator 232 and a logical AND gate 234. The differential amplifier 230 has first and second input terminals electrically coupled to nodes 165, 167, respectively. An output terminal of the differential amplifier 230 is electrically coupled to a first input terminal of the comparator 232. A second input terminal of the comparator 232 receives a reference voltage (Vbat-0.5). An output terminal of the comparator 232 is electrically coupled to a first input terminal of the logical AND gate 234. A second input terminal of the logical AND gate 234 receives a voltage (VL) that is also received by the gate terminal of the transistor 128. An output terminal of the logical AND gate 234 is electrically coupled to the logical OR gate 212.

Such a shorted phase coil condition leads to one or more technical problems with the motor control systems, and particularly in motor control system being used in a steering system. For example, in a shorted phase coil condition, if the motor controller is operated without taking corrective steps, a shorted condition could exist across a battery which could result in an undesired torque be produced by a motor and MOSFET thermal failure. In the present exemplary embodiments disclosed herein, the problems associated with the other systems is solved by a method for operating a motor to provide the steering assist even under the shorted phase coil condition.

Figure 4:
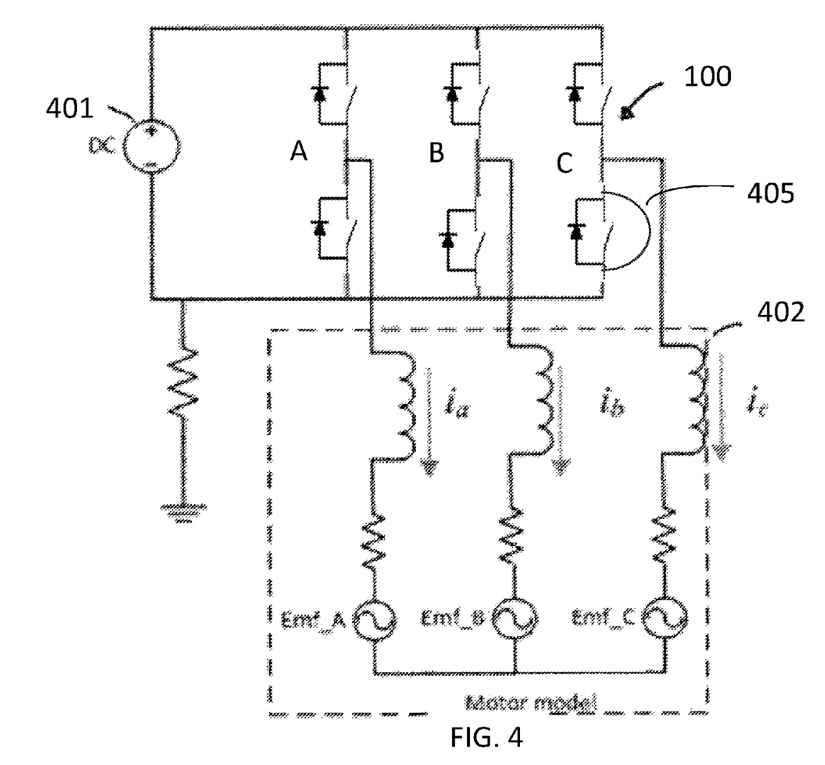
FIG. 4 illustrates a shorted inverter configuration according to one or more embodiments.

For example, FIG. 4 illustrates a shorted inverter configuration in accordance with one embodiment of the disclosure. FIG. 4 illustrates an abbreviated version of the circuit, with the plurality of MOSFETs 100 connected to a DC power supply 401. The plurality of MOSFETs 100 is configured to commutate for their respective motor phases (A, B, C). The motor model 402 may include a plurality of inductors and resistors. In this embodiment, a short 405 on the lower MOSFET connected to the C motor phase causes recirculation current when the motor is moving and producing back emf. It should be noted that the technical solutions herein are applicable in case of a short condition affecting any of the FETs, and that the lower C is just an example used herein. In addition, a braking torque may be generated that opposes motor and hand wheel movement. This braking torque may be a function of motor size and velocity along with assist ratios; a controller need not be powered with vehicle power. A braking torque is produced by the shorted MOSFET and by the internal body diodes of the other MOSFETs in the bridge. These MOSFETs will conduct at a back EMF greater than the diode conduction voltage. During a MOSFET short, a complementary FET cannot be commutated because commutation would only result in a direct short to ground (e.g. shoot through current), creating a thermal event with hundreds of amperes of current sourced by the power supply.

As shown in FIG. 4, the bridge is disabled but voltage from the back EMF will conduct internal body diodes of the MOSFETs through the short and result in braking torque.

As shown in FIG. 4, the power source 401 is connected to the plurality of switches that represent the plurality of MOSFETs 100. The motor model 402 is connected to the plurality of MOSFETs 100.

MOSFET mitigation may reduce the time and effort to steer the vehicle but produces a large amount of torque ripple, due to the increased velocity when applying assist.

Thus, when a MOSFET shorts, a technical problem is that a back EMF of the motor causes recirculation currents and generates a braking torque that opposes motor and hand wheel movement. Such torque generated is a function of motor size and velocity along with assist ratios. Further, the controller may not be powered or even plugged into vehicle power for such a braking torque to be generated. For example, the braking torque may be the consequence of the short and the internal body diodes of the other MOSFET's in the bridge that conduct at a back EMF greater than the diode voltage. For EPS systems, such MOSFET failure may generate torques that violate the maximum steering effort that the EPS systems are configured for, thus causing safety problems for the vehicle 10.

Typical solutions to the above technical problems included identifying the failed MOSFET and commutating the MOSFETS 100 to overcome the failed MOSFET. However, such solutions fail to address and reduce the excessive braking torque that is generated. Such excessing braking torque leads to a harsh feeling for an operator of the EPS system.

Figure 5:
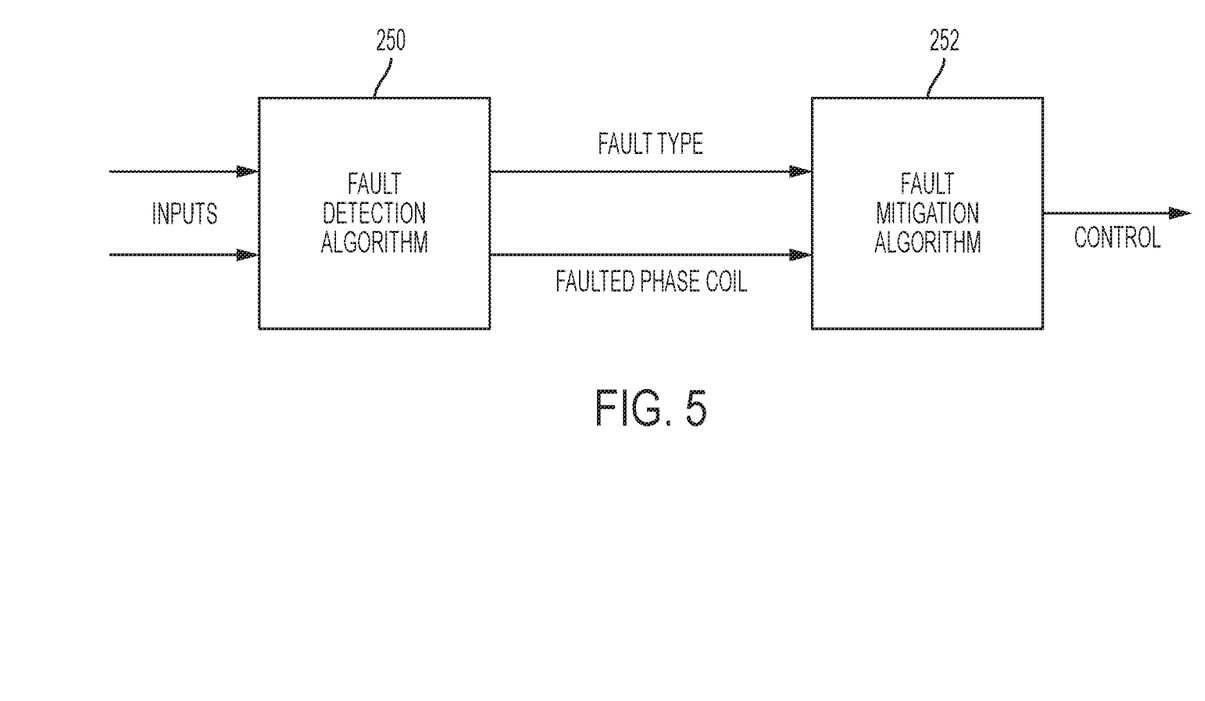
FIG. 5 illustrates a block diagram of fault detection module and a fault mitigation module utilized by a motor controller, according to one or more embodiments.

FIG. 5 illustrates a block diagram of fault detection module 250 and a fault mitigation module 252 utilized by the motor controller 78, according to one or more embodiments. When a fault condition of a phase coil is detected by the fault detection module 250, the fault detection module 250 sends a faulted phase identifier indicating a specific phase coil and a fault type identifier to the fault mitigation module 252. The fault mitigation algorithm 252 takes the appropriate action based upon the faulted phase identifier and the fault type identifier.

Figure 6:
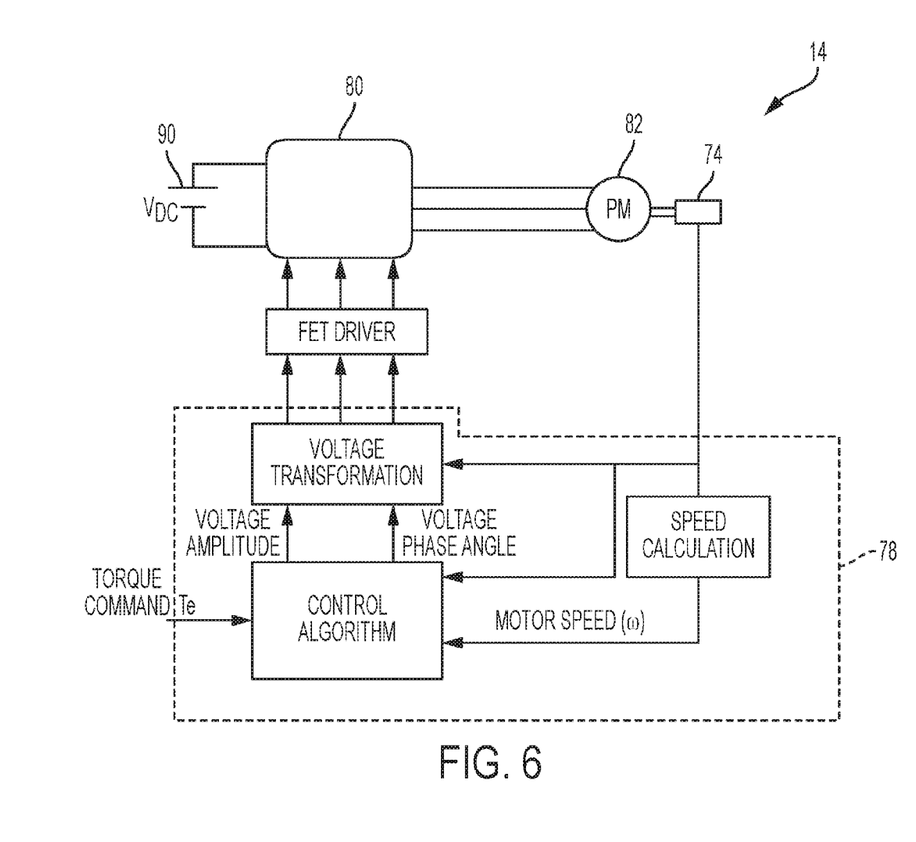
FIG. 6 illustrates a block diagram of a motor control system according to one or more embodiments.

FIG. 6 illustrates a block diagram of the motor control system 14 according to one or more embodiments. During operation, a phase voltage amplitude and phase advance angle are calculated based upon a desired motor torque and a motor speed. The phase advance angle is defined as an electrical angle between reference phase coil (e.g., phase coil 120) back emf and a voltage vector). A sinusoidal instantaneous line voltage is determined based on a calculated phase voltage amplitude, the phase advance angle, and a motor position and is applied across the phase coils. An instantaneous line voltage value is obtained by applying a pulse width modulated (PWM) voltage across the phase coils. The average value of the PWM voltage is equal to the desired instantaneous voltage applied at that position of the motor. The average voltage applied across each phase coil is calculated from the voltage amplitude and electrical angle according to the following equations:

$$Va = V \sin(\theta + \delta)$$

$$Vb = V \sin(\theta - 120 + \delta)$$

$$Vc = V \sin(\theta + 120 + \delta)$$

Here a, b and c represent the three phase coils of the motor, q is the instant motor position, V is the voltage amplitude, and q is the phase voltage angle (angle between back emf and the voltage vector). It should be noted that there are different methods of profiling the phase coil voltages in order to achieve a sinusoidal line-to-line voltage in a three phase coil Y-connected AC motor. One method is to apply sinusoidal voltages at the phase coil terminal. Another method is to apply a non-sinusoidal voltage across the phase coil terminals that results in a sinusoidal line-to-line voltage. In this method, the phase coil terminal voltage reference of all three phase coils is shifted by a known value.

When a fault condition occurs, a motor phase coil is shorted to one of the battery terminals, which means that the shorted phase voltage is either battery voltage or ground. In this event, the motor control system 14 shifts a phase coil terminal voltage reference so that a voltage applied at the shorted (faulted) phase coil terminal is equal to a voltage that would be obtained on the faulted phase coil terminal under a shorted condition. Further, the FETs are switched so that the average voltage across the three phase coils is equal to modified voltages. It should be noted that although the foregoing steps will provide a driver assist torque during a fault condition, there are also certain motor positions where a phase coil terminal voltage is clamped to a maximum value or a minimum value and thus a desired voltage cannot be applied to the motor to obtain a desired torque response. The motor control system 14, however, can modify a voltage phase angle so that an applied voltage to a phase coil at these certain motor positions is such that after changing the reference voltage, the amplitude of the phase coil voltage is within the clamped voltage range.

Alternatively, or in addition, the motor control system 14, to mitigate the FET short condition, modifies the phase advance angles associated with the phase coils of the motor 82, when one of the phase coils has a shorted operational condition to obtain a desired output torque.

Accordingly, the motor control system 14 provides a technical effect of determining when a shorted operational condition occurs at an input node of a phase coil and then controls a duty cycle of voltages applied to the phase coils to obtain a desired torque from the motor.

Figure 7:
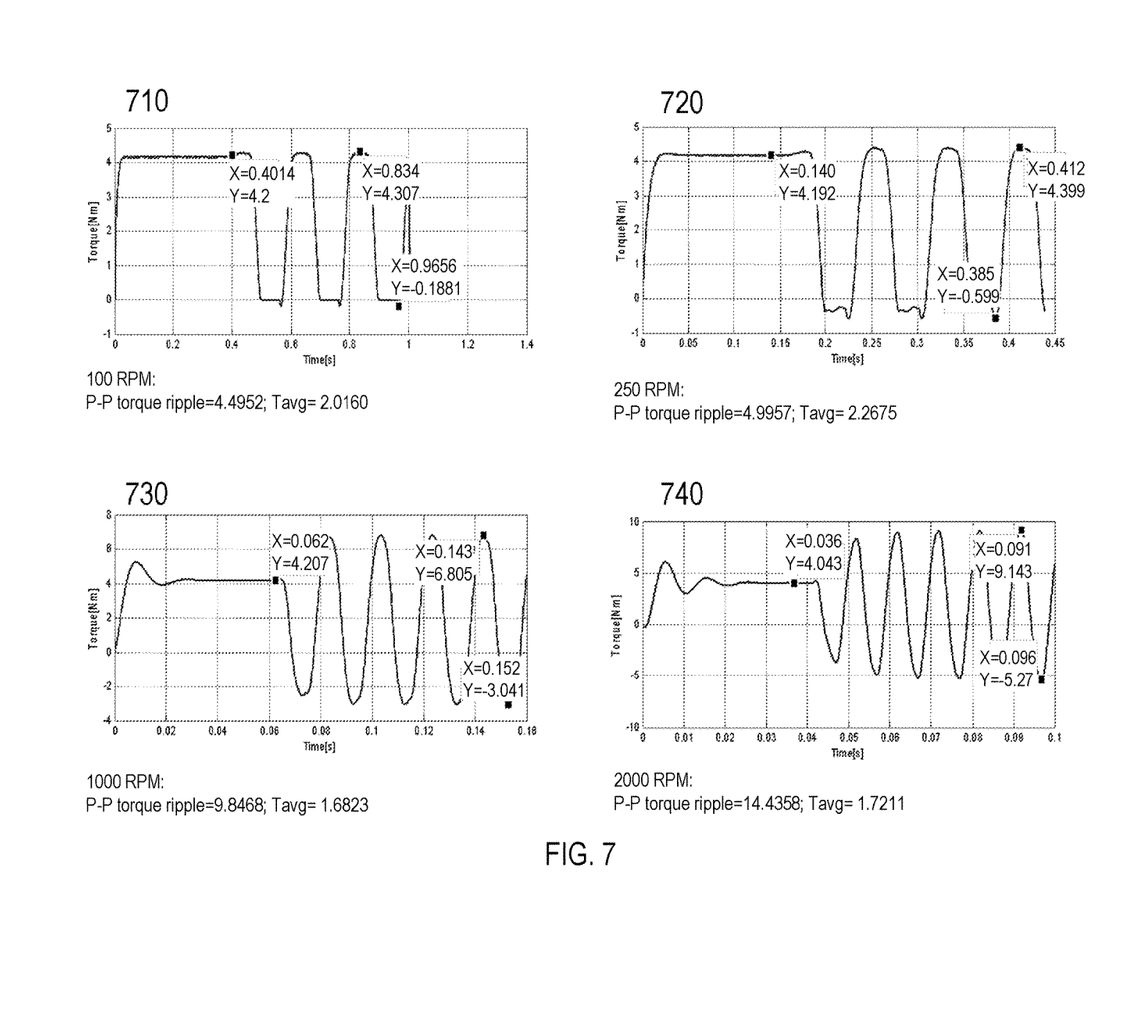
FIG. 7 illustrates example plots depicting motor assist torque generated with a FET short, according to one or more embodiments.

FIG. 7 illustrates example plots 710, 720, 730, and 740 at different motor velocities depicting assist torque generated with a MOSFET short condition with one of the FET mitigation techniques described earlier. As can be seen, an initial rise in the average torque is seen from the torque plots at low rpm (such as. 100 rpm, 250 rpm values). At such lower motor velocity, the torque has a negligible negative component, which increases the average torque value, whereas at higher motor velocity values the torque includes a relatively larger negative component. Hence, the average torque decreases at higher motor velocity values. Further, the torque value, after a delay, swings from positive to negative values (the ripple effect). Accordingly, the generated assist torque values vary continuously, and thus the ripple effect causes a harsh feeling for the operator that experiences these swings in the assist torque via the handwheel.

The technical solutions described herein address the above technical problems by addressing the MOSFET mitigation and further improving the operator feel. In one or more examples, the technical solutions herein provide a modulation index boost to the EPS system during MOSFET failure mitigation. Further, the technical solutions facilitate enabling/disabling the MOSFET mitigation as a function of HW torque. Further yet, the technical solutions herein provide damping as a function of filtered motor velocity. These and other technical features provided by the technical solutions are described in one or more embodiments of the technical solutions.

Figure 8:
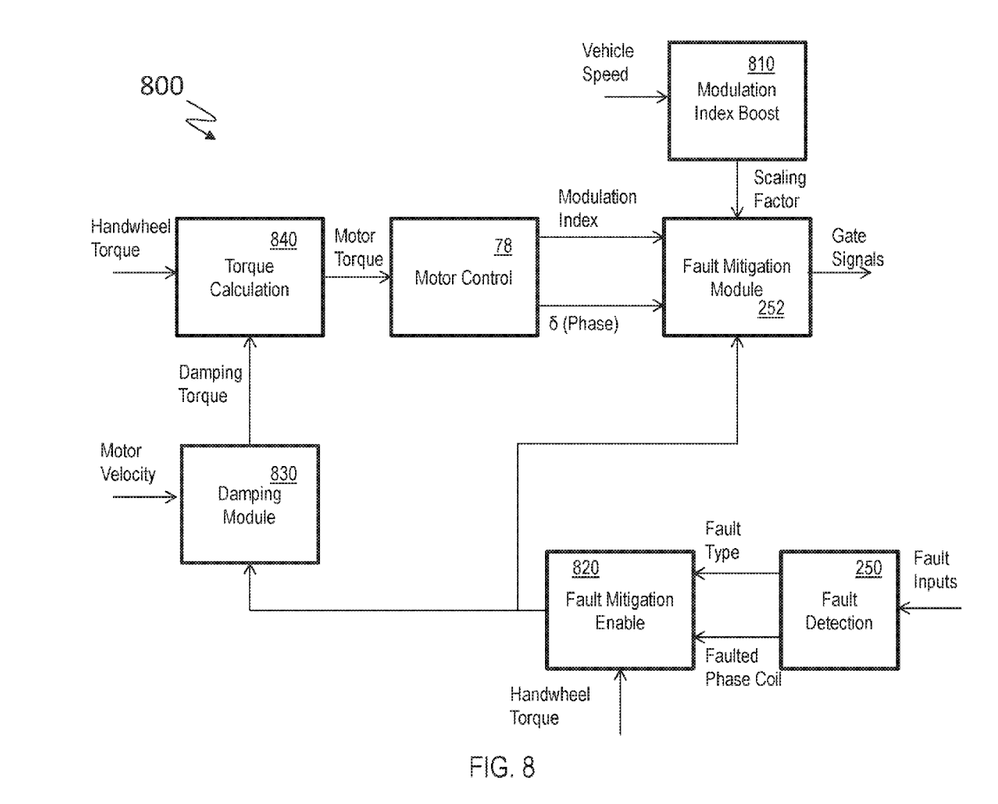
FIG. 8 illustrates a block diagram and data flow of a MOSFET mitigation system, according to one or more embodiments

FIG. 8 illustrates a block diagram and data flow of a MOSFET mitigation system 800, according to one or more embodiments. The MOSFET mitigation system 800 improves the FET mitigation system depicted in FIG. 5. For example, the MOSFET mitigation system 800 includes at least a modulation index boost module 810, a fault mitigation enable module 820, and a damping module 830, in addition to the fault detection module 250, the fault mitigation module 252, and the motor controller 78.

The enhanced MOSFET mitigation system may be configured as part of a steering control module to provide a FET mitigation motor torque command based on motor velocity and a motor torque command.

As described earlier (FIG. 7), at low handwheel velocities the braking torque is low so the FET mitigation produces more ripple than without the FET mitigation until a certain hand wheel velocity is reached. Hence, the MOSFET mitigation system 800 includes the mitigation-enable module 820 that selectively enables and disables the FET mitigation module 252 as a function of handwheel torque. At low handwheel velocities, such as below a predetermined threshold (for example, 10 rad/sec, 5 rad/sec, or the like) the braking torque caused by the shorted MOSFET. Further, the motor braking torque increases with motor velocity (see FIG. 7), however the handwheel torque is also dependent on road conditions and vehicle speed. When the load are low the operator can maneuver the handwheel without assist torque. Hence, the fault mitigation enable module 820 shuts off the fault mitigation module 252 because the assist will feel lumpy. The fault mitigation enable module 820 enables the mitigation module 252 when the assist motor torque is needed and does not cause discomfort. For example, if the vehicle speed is above a predetermined threshold (e.g. 20 kph, 30 kph or any other threshold), and/or not performing a handwheel maneuver (such as a turn) assist torque may not be required, and so the mitigation is shut off. When the operator is at a speed or condition, like a turn or lower vehicle speeds the mitigation enable module 820 provides the assist from the FET failure mitigation module 252.

Accordingly, the handwheel torque signal is used as an input of the mitigation-enable module 820 to enable/disable the FET mitigation module 252. For example, until the operator applies a handwheel torque above a predetermined value the FET mitigation module 252 may not be activated to assist in case of the shorted FET. As the motor velocity increases the braking torque increases, which effectively produces handwheel torque over the threshold enabling the FET mitigation module 252.

In one or more examples, the hand wheel torque below the predetermined threshold (for example 7 Nm or less) may cause the FET mitigation module 252 to set the power steering system in manual mode when operating in the MOSFET short condition. Thus, the mitigation-enable module 820 uses the handwheel torque signal to enable and disable the FET mitigation module 252. This improves the operator feel at higher vehicle speeds when assist levels are low and motor velocities are below the diode conduction voltages from the back EMF.

Further, the modulation index boost module 810 provides a modulation index boost as a function of vehicle speed (x-axis variable) which is applied to the motor torque in response to the fault mitigation being enabled. For example, the modulation index boost module 810 determines a scaling factor that is applied to the modulation index. The modulation index is a percentage of power supply 90 voltage applied to the motor 82 before using sine table. The motor controller 78 generates the modulation index to control the motor 82. The motor 82 generates the assist motor torque proportional to the modulation index.

The modulation index boost module 810 forwards the scaling factor to the FET mitigation module 252 that applies the scaling factor to the modulation index in response to the fault mitigation being enabled. In one or more examples, the scaling factor is limited, for example to 1.5, to protect the inverter from further damage. In one or more examples, the modulation index boost module 810 includes a look-up table for mapping a vehicle speed with a scaling factor to use to boost the modulation index. The modulation index boost module 810 may further interpolate between the vehicle speeds in the look-up table to determine the scaling factor for vehicle speeds that are not listed in the look-up table. In other examples, the modulation index boost module 810 determines the scaling factor using any other technique.

Further, the MOSFET mitigation system 800 includes a damping module 830 that provides damping as a function of filtered motor velocity to reduce the motor torque as a function of the filtered motor velocity. The damping lowers the effective impact of the braking torque because braking torque is a function of back EMF, which is a function of motor speed. In one or more examples, a damping constant is incorporated as a function of the vehicle speed.

Figure 9:
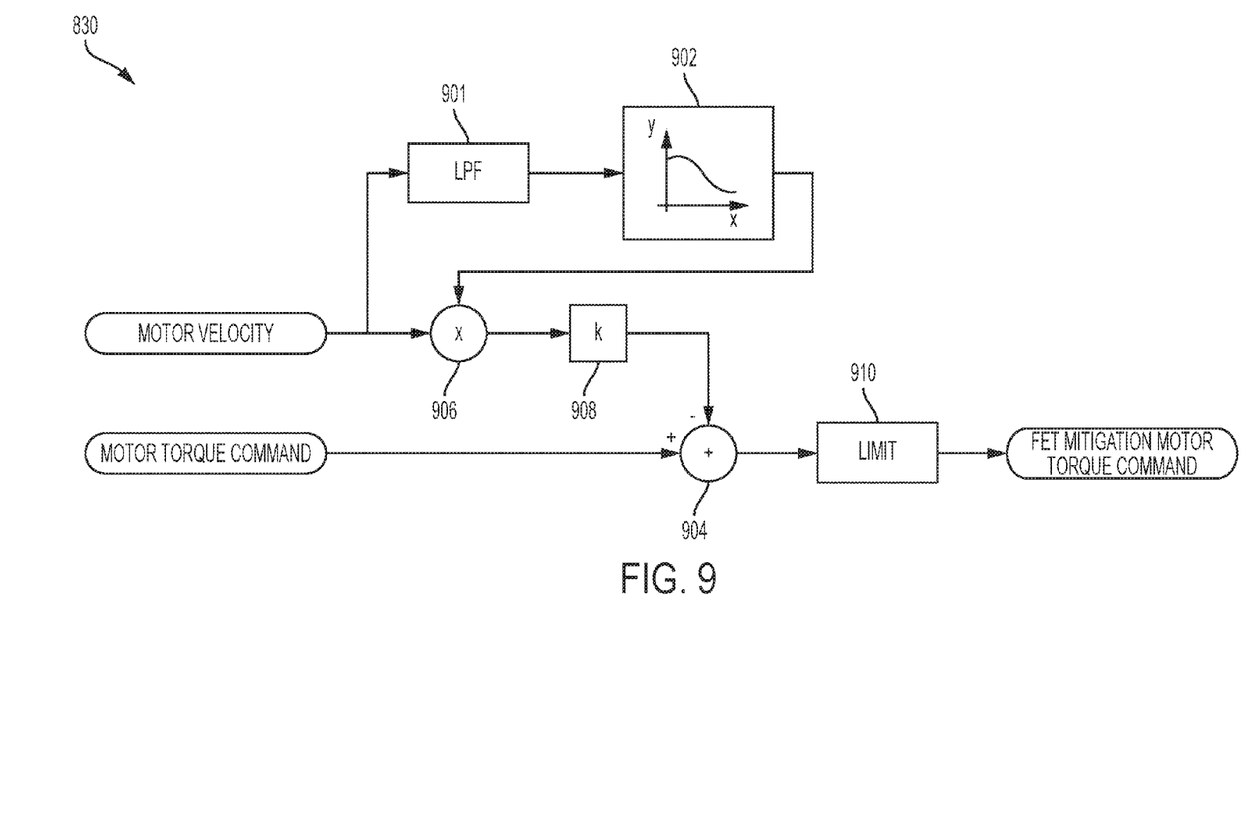
FIG. 9 illustrates example components and data flow for damping module, according to one or more embodiments

FIG. 9 illustrates example components and data flow for the damping module 830, according to one or more embodiments. The damping module 830 receives the motor velocity and the motor torque as inputs. The motor torque may be the output from the FET mitigation module 252.

The motor velocity signal is input to a low pass filter 901 to remove any high-frequency artifacts from the motor signal. A damping-factor module 902 determines a damping factor based on the filtered motor velocity signal. The damping-factor is multiplied with the motor velocity signal at a multiplication block 906, and adjusted by a constant block 908. The constant block 908 scales the output of the multiplier block 906 and converts the output into torque values.

The output of the constant block 908 may be subtracted from the motor torque command at block 904. A limiter module 910 may selectively limit the output of junction 904, producing a FET mitigation motor torque command.

Figure 10:
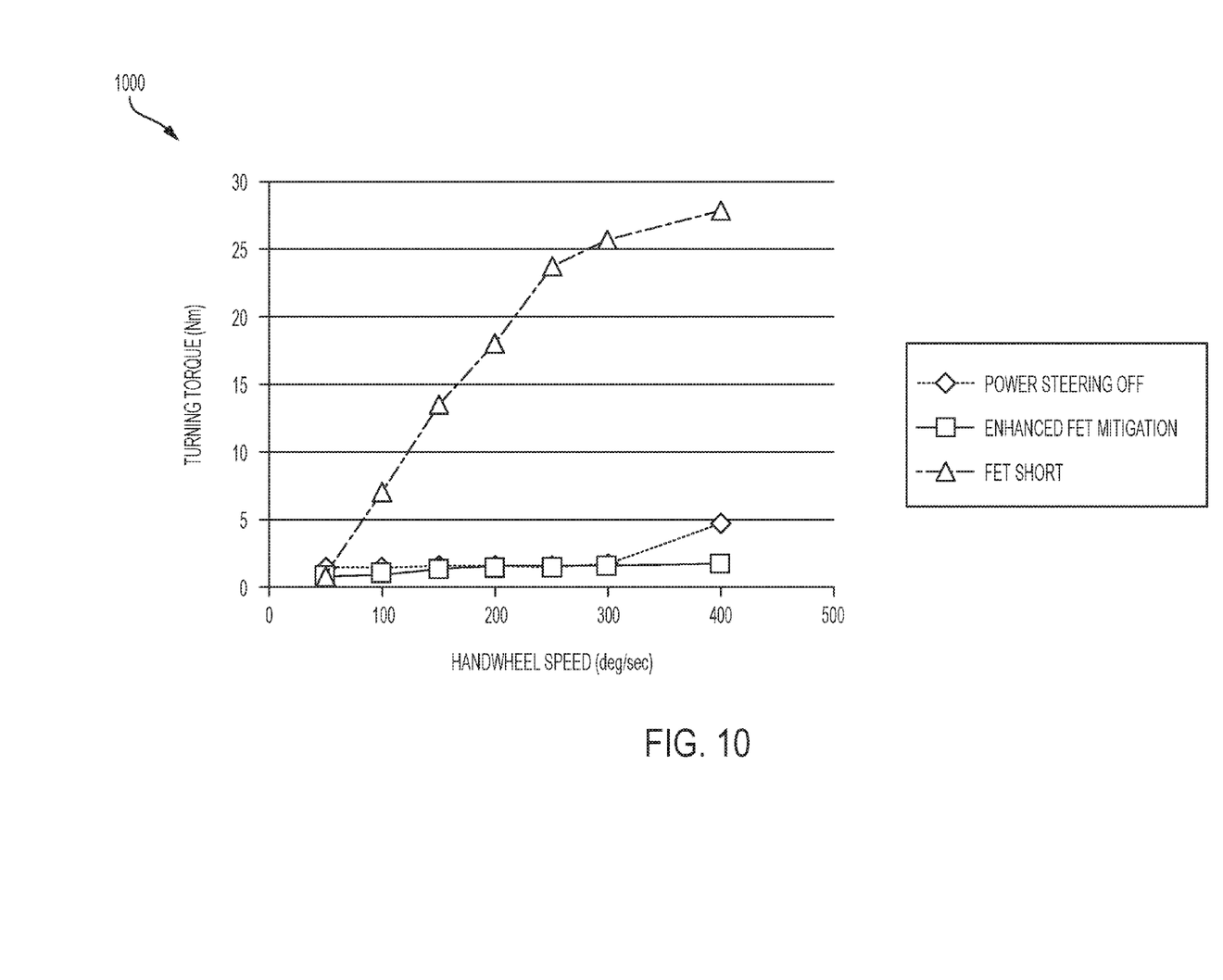
FIG. 10 shows a plot of turning torque and handwheel speed, according to one or more embodiments.

FIG. 10 shows a plot 1000 of turning torque experienced by the operator during operation of a steering system with a FET short condition over handwheel speeds for three options—power steering off (no assist, or manual mode), FET mitigation without the technical features herein (FET Short), and the enhanced FET mitigation described herein. As can be appreciated, the technical solutions described herein, using the enhanced FET mitigation system 800 facilitate providing a uniform and lowest handwheel torque required by the operator, thus resulting in the most comfortable ride among the three.

The technical features described herein facilitate an improvement to a FET fault mitigation system by improving the abrupt ripple back to the driver due to the braking torque of the shorted FET. The technical features facilitate enabling an existing FET mitigation system that a steering system may be equipped with. In one or more examples, the technical solutions enable/disable the FET mitigation system based on the handwheel torque signal. Further, the technical solutions provide a modulation index boost during FET mitigation. Further yet, the technical solutions provide a damping of the torque command based on filtered motor velocity.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A system for mitigating braking torque in a motor of a steering system, the system comprising:
   a mitigation module that adjusts a motor torque in response to a FET short;
   a mitigation-enable module that selectively enables and disables the mitigation module based on a handwheel torque signal; and
   a damping module that reduces the motor torque based on a motor velocity signal for the motor.

2. The system of claim 1, wherein the mitigation-enable module enables the mitigation module in response to the handwheel torque signal being above a predetermined threshold.

3. The system of claim 2, wherein the mitigation-enable module disables the mitigation module in response to the handwheel torque signal being at or below the predetermined threshold.

4. The system of claim 1, wherein the handwheel torque signal is indicative of input torque to the steering system in response to the FET short.

5. The system of claim 1, wherein the mitigation module determines a scaling factor for a modulation index used during mitigation of the FET short.

6. The system of claim 1, wherein the damping module includes a low pass filter that generates filtered motor velocity prior to determining a damping-factor to reduce the motor torque.

7. The system of claim 1, wherein the damping module is configured to reduce a braking torque component included in the motor torque according to a back electro-magnetic field of the motor.

8. The system of claim 7, wherein the back electro-magnetic field is proportional to the motor velocity.

9. A method for mitigating braking torque in a motor, the method comprising:
   adjusting, by a mitigation module, a motor torque generated by the motor in response to a FET short;
   selectively enabling and disabling, by a mitigation-enable module, the mitigation module based on an input torque signal; and
   reducing, by a damping module, the motor torque based on a motor velocity signal for the motor.

10. The method of claim 9, further comprising enabling the mitigation module, by the mitigation-enable module, in response to the input torque signal being above a predetermined threshold.

11. The method of claim 10, further comprising disabling the mitigation module, by the mitigation-enable module, in response to the input torque signal being at or below the predetermined threshold.

12. The method of claim 9, wherein the input torque is indicative of a torque generated by the motor in a previous iteration.

13. The method of claim 9, further comprising determining, by the mitigation module, a scaling factor for a modulation index used during mitigation of the FET short.

14. The method of claim 9, further comprising filtering, by the damping module, using a low pass filter, the motor velocity prior to determining a damping-factor to reduce the motor torque.

15. The method of claim 9, further comprising reducing, by the damping module, a braking torque component included in the motor torque according to a back electro-magnetic field of the motor.

16. The method of claim 15, wherein the back electro-magnetic field is proportional to the motor velocity.

17. A computer program product comprising a non-volatile computer readable storage medium, the computer readable storage medium comprising computer executable instructions, wherein the computer readable storage medium comprises instructions to:
   adjust, by a mitigation module, a motor torque generated by the motor in response to a FET short, the motor torque being generated to assist an input torque;
   selectively enable and disable the mitigation module based on the input torque; and
   reduce the motor torque based on a motor velocity signal for the motor.

18. The computer program product of claim 17, further comprising instructions to enable the mitigating in response to the input torque being above a predetermined threshold.

19. The computer program product of claim 18, further comprising instructions to disable the mitigating in response to the input torque being at or below the predetermined threshold.

20. The computer program product of claim 17, wherein reducing the motor torque comprises: reducing a braking torque component included in the motor torque according to a back electro-magnetic field of the motor, the back electro-magnetic field being proportional to the motor velocity.

* * * * *